Jan. 19, 1932.  C. L. BASTIAN  1,842,236
TWO-STAGE REGULATOR
Filed Sept. 7, 1929
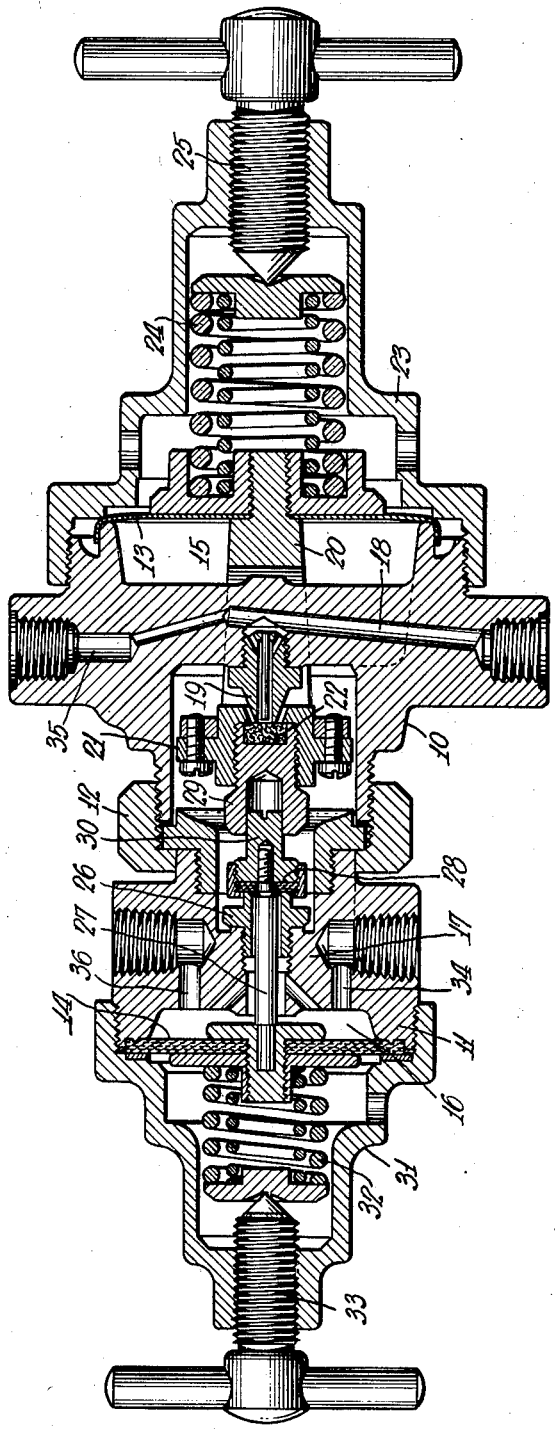
INVENTOR
Charles L. Bastian.
BY
Dean, Fairbank, Obreght & Hirsch
ATTORNEYS Patented Jan. 19, 1932

1,842,236

UNITED STATES PATENT OFFICE

CHARLES L. BASTIAN, OF CHICAGO, ILLINOIS, ASSIGNOR TO THE BASTIAN-BLESSING COMPANY, OF CHICAGO, ILLINOIS, A CORPORATION OF ILLINOIS

TWO STAGE REGULATOR

Application filed September 7, 1929. Serial No. 390,948.

In the use of oxy-acetylene welding and cutting torches the oxygen and acetylene are usually drawn from cylinders containing the gases under high pressure, and it is necessary that these pressures be reduced to a few pounds in order that the proper neutral flame may be produced and maintained at the torch tip.

Two types of regulators are in common use and have been employed for this purpose. In one type, which may be designated as the positive type, there are two sources of pressure tending to open the valve. These are the gas at the high or supply pressure, acting directly on the valve, and a spring acting on the diaphragm connected to the valve. The gas at the outlet pressure acts on the diaphragm in opposition to the spring and inlet pressure, and tends to close the valve. In this type of regulator a decrease in the inlet pressure due to the using up of the gas in the cylinder results in a decrease in the outlet pressure, assuming that the spring pressure remains constant. In the other type of regulator, which may be designated as the negative type, there are two sources of pressure tending to close the valve. The inlet pressure acts directly on the valve and the outlet pressure is exerted in the diaphragm which is connected to the valve. The spring acts against both pressures to open the valve. In this type a decrease in the inlet pressure causes an increase in the outlet pressure. In both types the lower or outlet pressure acts against the spring, but in one the inlet pressure tends to open the valve and in the other it tends to close the valve.

It has been proposed to use two pressure regulators arranged in series to step down the high pressure to the low pressure required at the torch tip. The usual arrangement is to connect up two separate regulators of the same type. In order to maintain the torch pressure constant it is necessary with such an arrangement to make frequent adjustments of the spring pressures of the two regulators. Furthermore, in order to establish a satisfactory working condition it is usually necessary to make initial adjustments after several successive closings of a valve controlling the flow from the regulator to the torch in order to bring the springs and diaphragms to satisfactory operating conditions.

When the gases are shut off at the torch, or at any point beyond the regulator, the valves at the regulators automatically close and in usual practice the flame does not always readjust itself to form a neutral cone, even after an appreciable period following the reopening of the torch valves and the relighting of the torch. What I designate as the "torch valves" are for direct control of the flame, and are not necessarily on the torch. They may be at any point in the conduits between the regulators and the torch. For instance, they may be in a separate valve block and operated by a lever or hook on which the torch is supported when not in use.

The main object of my invention is to provide a two stage pressure regulator in which the adjustment of the neutral cone of the flame is easily obtained and maintained substantially permanent; in which the minimum initial adjustments are necessary to bring about satisfactory working conditions; and in which there will be a positive instantaneous and correct re-establishment of the cone when the torch valves are opened after they have been closed.

My improved construction also permits a longer period of maintenance of the correct neutral cone during use of the torch and as the gas pressures in the cylinder are decreasing.

As one important feature of my invention I provide a two stage regulator as a single article of manufacture as distinguished from the usual practice of connecting up two standard regulators in series. Thus the cost of manufacture is decreased and a more compact apparatus is produced and the weight of the apparatus brought closer to the center of support whereby the strain on the parts is reduced and stability increased. The two diaphragms are preferably parallel and co-axial and the valves are in alignment whereby a symmetrical and simple housing may be employed.

As a further important feature I so design the two parts of the regulator that they are of different types, that is, one part is of the negative type and the other is of the positive type, whereby the gradual decrease in outlet pressure from one is compensated for by the gradual increase in outlet pressure of the other.

As a further important feature the regulator is so designed that both valves and all of the automatically operating parts are housed between the two diaphragms and the two adjusting springs are at opposite sides of the casing and readily readjusted as action may require.

As a further important feature I simplify the construction and reduce the number of parts and the cost of manufacture by utilizing one of the valves as a guide or centering device for the other valve whereby proper seating of both valves is insured.

In the accompanying drawing I have illustrated merely one embodiment of my invention and have included many of the standard parts and details which have heretofore been employed in single stage regulators of the two types.

Various changes may be made in the details of construction and the arrangement of the parts illustrated within the spirit of my invention and within the scope of the appended claims.

The accompanying drawing is a central longitudinal section of a regulator constructed in accordance with my invention.

In the construction illustrated there is provided a main casing which includes two casing sections 10 and 11 which may be detachably connected together in any suitable manner as for instance by means of a threaded collar or union 12. One end of the casing is closed by a metal diaphragm 13 while the opposite end is closed by a rubber diaphragm 14. The two diaphragms are parallel and all of the automatically operating parts as well as the inlet, outlet and pressure gauge connections are between the two diaphragms. The interior of the casing is divided into two compartments 15 and 16 by a transverse partition 17. The compartment 15 contains the gas under what may be designated as the intermediate pressure, while the compartment 16 contains the gas under the low or delivery pressure.

The part of the regulator for stepping down the gas pressure from the high or inlet pressure to the intermediate pressure is of the positive type. The high pressure gas is delivered through an inlet passage 18 to a nozzle 19 which faces away from the diaphragm 13. The diaphragm has connected thereto a yoke 20 which carries a plate 21 and within this plate is the valve seat 22 adjacent to the end of the nozzle 19. The diaphragm is clamped in place by a cover 23 within which is mounted the diaphragm spring or springs 24 and the spring tension adjusting means 25. When the intermediate pressure in the chamber 15 falls below a predetermined limit the spring 24 plus the pressure of the gas in the nozzle 19 will act on the diaphragm and the valve seat to move the seat away from the nozzle and permit the delivery of high pressure gas to the intermediate pressure chamber.

The section 11 of the regulator has a passage through the partition 17 and at the side of the partition toward the intermediate pressure chamber there is a nozzle 26. This is very much larger than the nozzle 19 and has extending through it a valve stem 27 which is connected to the rubber diaphragm 14. On the end of the valve stem is a valve seat 28 for engaging the end of the nozzle 26.

As one feature of my invention the valve seat 22 is carried in a sleeve or plug 29 and the valve seat 28 is carried by a plug or pin 30 which is mounted to telescope within and be guided by the sleeve or plug 29.

The outer end of the casing is closed by a cover 31 within which is mounted the usual diaphragm spring or springs 32 and the usual spring tension regulating means 33.

The intermediate chamber 15 extends past both of the valve members to the end of the nozzle 26. When the low pressure in the chamber 16 is below a predetermined limit the spring 32 acting on the diaphragm 14 will force the valve seat 28 away from the nozzle 26 and will permit gas to flow from the intermediate pressure chamber along the valve stem 27 to the low pressure chamber 16.

It will be noted that the pressure in the intermediate chamber acts upon the plug 30 and its valve seat and tends to close the valve against the action of the spring. Thus the intermediate pressure acting on the valve is supplemented by the low pressure acting on the diaghragm and the two pressures act against the spring, whereas at the other end of the apparatus the high pressure gas acts with the spring in tending to open the valve and against the intermediate pressure in the chamber 15. As the high pressure of the gas delivered from the source through the passage 18 decreases there will be a corresponding but far less decrease in the pressure in the intermediate chamber. As the pressure in the intermediate chamber decreases there will be a tendency toward an increase in the pressure in the low pressure chamber 16 because there will be less effect of the intermediate pressure in opposition to the spring and the spring will more easily open the valve to let gas flow from the intermediate pressure chamber to the low pressure chamber. The gas may be drawn off through the outlet or delivery passage 34.

The apparatus is preferably provided with connections for a pair of pressure gauges which may be mounted closely adjacent to each other due to the small and compact size of the apparatus. A passage 35 leads from the inlet or high pressure passage 18, and a passage 36 leads from the low pressure chamber 16. Each passage leads to a socket into which the usual pressure gauges may be screwed. If the regulator is to be used with a cutting torch the cutting oxygen may be taken directly from the intermediate pressure chamber 15 through a separate passage on the side of the casing, and not shown, and a third gauge may be connected to this opening to indicate the intermediate pressure.

It will be noted that as the diaphragms are parallel and coaxial and the inlet and outlet passages are between the diaphragms, and the inlet passage which is usually connected to the cylinder is fairly centrally located, a symmetrical and well balanced construction is provided.

Having thus described my invention, what I claim as new and desire to secure by Letters Patent is:

1. A fluid pressure regulator, including a housing having an intermediate pressure chamber and a low pressure chamber and diaphragms forming the outer opposed walls of said chambers, said chambers being arranged in axial alignment and said diaphragms being parallel, a valve for admitting fluid under high pressure to the intermediate pressure chamber, and a valve for controlling the discharge of fluid from the intermediate pressure chamber to the low pressure chamber, both of said valves being disposed between said diaphragms and one of said valves having a part slidably engaging a part of the other valve.

2. A fluid pressure regulator, including two pressure chambers, a fluid supply nozzle and a fluid discharge nozzle, both in one of said chambers, a pair of separate valves cooperating with said nozzles to open and close the same, and separate means in the two chambers for controlling the movement of said valves to and from their respective nozzles, said valves being in alignment and having sliding engagement with each other whereby each acts as a guide for the other.

3. A two stage fluid pressure regulator, including a housing having diaphragms forming the opposite end walls thereof, a partition between said diaphragms forming with said housing and diaphragms an intermediate pressure chamber and a low pressure chamber, a pair of valves, both in the same chamber, one connected to one diaphragm for controlling admission of fluid to said intermediate pressure chamber and the other connected to the other diaphragm for controlling the flow from said intermediate pressure chamber to said low pressure chamber, said valves being in alignment and one of said valves serving as a guide for the other.

4. A two stage fluid pressure regulator, including a housing having diaphragms forming the opposite end walls thereof, a partition between said diaphragms forming with said housing and diaphragms an intermediate pressure chamber and a low pressure chamber, separate springs outside of said housing and upon the outer sides of said diaphragms tending to press said diaphragms toward each other, separate means at the outer ends of said springs for regulating the pressure thereof, valves within said housing and connected to said diaphragms for controlling the flow of fluid into said intermediate pressure chamber and from the latter to said low pressure chamber, and means in one of said chambers for holding said valves in alignment with each other.

5. A two stage fluid pressure regulator, including a housing having diaphragms forming the opposite end walls thereof, a partition between said diaphragms forming with said housing and diaphragms an intermediate pressure chamber and a low pressure chamber, separate springs outside of said housing and upon the outer sides of said diaphragms tending to press said diaphragms toward each other, separate means at the outer ends of said springs for regulating the pressure thereof, and valves within said housing and connected to said diaphragms for controlling the flow of fluid into said intermediate pressure chamber and from the latter to said low pressure chamber, both of said valves being in the same chamber and each serving as a guide for the other.

Signed at Chicago in the county of Cook, and State of Illinois, this 31st day of August A. D. 1929.

CHARLES L. BASTIAN.